(12) United States Patent
Tong et al.

(10) Patent No.: US 11,720,214 B2
(45) Date of Patent: Aug. 8, 2023

(54) TOUCH PANEL, DISPLAY DEVICE, DISPLAY SYSTEM, AND TOUCH METHOD WITH PHOTOSENSITIVE LAYER FOR IN-THE-AIR INPUT DETECTION

(71) Applicants: Beijing BOE Display Technology Co., Ltd., Beijing (CN); BOE Technology Group Co., Ltd., Beijing (CN)

(72) Inventors: Guangyun Tong, Beijing (CN); Yu Zhang, Beijing (CN); Zhuolong Li, Beijing (CN); Liang Bo, Beijing (CN); Xuefei Qin, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/578,284

(22) Filed: Jan. 18, 2022

(65) Prior Publication Data

US 2022/0269373 A1    Aug. 25, 2022

(30) Foreign Application Priority Data

Feb. 23, 2021   (CN) .......................... 202110203706.8

(51) Int. Cl.
```
G06F 3/044      (2006.01)
G06F 3/041      (2006.01)
G06F 3/0346     (2013.01)
G06V 40/13      (2022.01)
```

(52) U.S. Cl.
CPC .......... *G06F 3/0445* (2019.05); *G06F 3/0346* (2013.01); *G06F 3/0412* (2013.01); *G06F 3/0446* (2019.05); *G06F 3/04164* (2019.05); *G06F 2203/04106* (2013.01); *G06F 2203/04114* (2019.05); *G06V 40/1318* (2022.01)

(58) Field of Classification Search
CPC .. G06F 3/0346; G06F 3/0412; G06F 3/04164; G06F 3/0445; G06F 3/0446; G06F 2203/04106; G06F 2203/04114; G06V 40/1318
See application file for complete search history.

(56) References Cited

U.S. PATENT DOCUMENTS

| | | | |
|---|---|---|---|
| 2014/0002416 A1* | 1/2014 | Ma ......................... | G06F 3/0445 345/174 |
| 2016/0139699 A1* | 5/2016 | Barel .................... | G06F 3/0445 345/174 |
| 2017/0147097 A1* | 5/2017 | Park ...................... | G06F 3/0416 |
| 2018/0277787 A1* | 9/2018 | Pei ........................ | H01L 51/5206 |
| 2018/0300007 A1* | 10/2018 | Xu ......................... | G06F 3/0445 |
| 2020/0322556 A1* | 10/2020 | Tokuhara .............. | H01L 27/307 |

* cited by examiner

*Primary Examiner* — Liliana Cerullo
(74) *Attorney, Agent, or Firm* — IPro, PLLC

(57) ABSTRACT

Provides is a touch panel. The touch panel includes: a first electrode layer, a photosensitive layer, and a second electrode layer that are laminated, wherein the photosensitive layer is insulated from the first electrode layer and the second electrode layer, and the first electrode layer, the photosensitive layer, and the second electrode layer are capable of forming a plurality of touch units arranged in an array. The photosensitive layer is configured to generate a dielectric constant change at a position under irradiation by light from a line light source.

5 Claims, 5 Drawing Sheets

|  | Rx1 | Rx2 | Rx3 | Rx4 | Rx5 |
|---|---|---|---|---|---|
| Tx1 | 4090 | 4086 | 4088 | 4087 | 4085 |
| Tx2 | 4090 | 4086 | 4088 | 4087 | 4085 |
| Tx3 | 4090 | 4086 | 4088 | 4087 | 4085 |
| Tx4 | 4090 | 4086 | 4088 | 4087 | 4085 |
| Tx5 | 4090 | 4086 | 4088 | 4087 | 4085 |

FIG. 9

|  | Rx1 | Rx2 | Rx3 | Rx4 | Rx5 |
|---|---|---|---|---|---|
| Tx1 | 4090 | 4086 | 4088 | 4087 | 4085 |
| Tx2 | 4052 | 4088 | 4086 | 4087 | 4125 |
| Tx3 | 4041 | 4088 | 4087 | 4086 | 4125 |
| Tx4 | 4034 | 4087 | 4086 | 4087 | 4087 |
| Tx5 | 4090 | 4086 | 4088 | 4086 | 4087 |

FIG. 10

|  | Rx1 | Rx2 | Rx3 | Rx4 | Rx5 |
|---|---|---|---|---|---|
| Tx1 | 0 | 0 | 0 | 0 | 0 |
| Tx2 | 38 | -2 | 2 | 0 | -40 |
| Tx3 | 49 | -2 | 1 | 1 | -40 |
| Tx4 | 86 | 1 | 2 | 0 | 0 |
| Tx5 | 0 | 0 | 0 | 1 | -2 |

FIG. 11

TOUCH PANEL, DISPLAY DEVICE, DISPLAY SYSTEM, AND TOUCH METHOD WITH PHOTOSENSITIVE LAYER FOR IN-THE-AIR INPUT DETECTION

This application claims priority to the Chinese Patent Application No. 202110203706.8, filed on Feb. 23, 2021 and entitled "TOUCH PANEL, DISPLAY DEVICE, DISPLAY SYSTEM, AND TOUCH METHOD," the disclosure of which is herein incorporated by reference in its entirety.

TECHNICAL FIELD

The present disclosure relates to the field of display technologies, and in particular, relates to a touch panel, a display device, a display system, and a touch method.

BACKGROUND

With the popularity of consumer electronic products such as smart phones, touch display devices have been widely recognized by people. The traditional touch display device generally achieves touch by a contact operation of a human hand or a stylus. For a large-sized touch display device, an operator needs to approach the touch display device to perform a touch operation.

SUMMARY

Embodiments of the present disclosure provide a touch panel, a display device, a display system, and a touch method.

In a first aspect of the embodiments of the present disclosure, a touch panel is provided.

The touch panel includes: a first electrode layer, a photosensitive layer, and a second electrode layer that are laminated, wherein the photosensitive layer is insulated from the first electrode layer and the second electrode layer, and the first electrode layer, the photosensitive layer, and the second electrode layer form a plurality of touch units arranged in an array; wherein the photosensitive layer is configured to generate a dielectric constant change at a position under irradiation by light from a line light source.

In some embodiments, the touch panel further includes: a plurality of touch drive lines connected to the plurality of touch units, wherein the plurality of touch drive lines are configured to load drive signals to the plurality of touch units; and a plurality of touch sensing lines connected to the plurality of touch units, wherein the plurality of touch sensing lines are configured to receive sensing signals output by the plurality of touch units; wherein the photosensitive layer is configured to: generate the dielectric constant change at the position under irradiation by the line light source to change the sensing signal output by the touch unit in the case that the drive signal is loaded by the touch unit and the line light source irradiates the touch unit.

In some embodiments, the first electrode layer includes a plurality of strip-shaped drive electrodes, the second electrode layer includes a plurality of strip-shaped sensing electrodes, wherein an extension direction of the drive electrode is intersected with an extension direction of the sensing electrode, and the plurality of touch units are disposed in an intersection area defined by the plurality of strip-shaped drive electrodes and the plurality of strip-shaped sensing electrodes; wherein the plurality of touch drive lines are connected to a plurality of the drive electrodes, and the plurality of touch sensing lines are connected to a plurality of the sensing electrodes.

In some embodiments, the extension direction of the sensing electrode is perpendicular to the extension direction of the drive electrode.

In some embodiments, the touch panel further includes: a first insulating layer disposed between the first electrode layer and the photosensitive layer, and a second insulating layer disposed between the second electrode layer and the photosensitive layer.

In some embodiments, the first insulating layer and the second insulating layer are both made of insulated optical adhesives.

In some embodiments, the photosensitive layer is made of cadmium sulfide, aluminum selenide, aluminum sulfide, lead sulfide, or bismuth sulfide.

In some embodiments, the first electrode layer and the second electrode layer are both made of a transparent conductive material.

In a second aspect of the embodiments of the present disclosure, a display device is provided.

The display device includes: a display panel and a touch panel disposed on a light-emitting side of the display panel, wherein the touch panel includes: a first electrode layer, a photosensitive layer, and a second electrode layer that are laminated, the photosensitive layer being insulated from the first electrode layer and the second electrode layer, and the first electrode layer, the photosensitive layer, and the second electrode layer forming a plurality of touch units arranged in an array; wherein the photosensitive layer is configured to generate a dielectric constant change at a position under irradiation by light from a line light source.

In some embodiments, the touch panel further includes: a plurality of touch drive lines connected to the plurality of touch units, and a plurality of touch sensing lines connected to the plurality of touch units; and the display device further includes: a controller configured to: load drive signals to the plurality of touch units via the plurality of touch drive lines; receive sensing signals output by the plurality of touch units via the plurality of touch sensing lines; and determine a first position under irradiation by the line light source in the touch panel based on the received sensing signals.

In some embodiments, the controller is configured to: determine current capacitances of the touch units in the touch panel based on the received sensing signals; determine capacitance change values of the touch units based on the current capacitances of the touch units and reference capacitances of the touch units; and determine the first position under irradiation by the line light source in the touch panel based on the capacitance change values of the touch units.

In some embodiments, the controller is further configured to: determine a second position under pressing in the touch panel based on the capacitance change values of the touch units.

In some embodiments, the controller is configured to: determine a difference value between the reference capacitance of each of the touch units and the current capacitance of the touch unit as the capacitance change value of the touch unit; determine the position of the first touch unit in the touch panel as the first position in the case that the capacitance change value of a first touch unit is a negative value and a capacitance change value of the first touch unit is less than a first threshold; and determine the position of the second touch unit in the touch panel as the second position in the case that the capacitance change value of a second touch unit is a positive value and the capacitance change value of the second touch unit is greater than a second threshold; wherein each of the first touch unit and the second touch unit is any one of the plurality of touch units, the first threshold is a negative value, and the second threshold is a positive value.

In some embodiments, the controller is further configured to: control the display panel to display a cursor at a third position corresponding to the first position under irradiation by the line light source.

In a third aspect of the embodiments of the present disclosure, a display system is provided.

The display system includes: a line light source and a display device, wherein the display device includes: a display panel, and a touch panel disposed on the light-emitting side of the display panel; wherein the touch panel includes: a first electrode layer, a photosensitive layer, and a second electrode layer that are laminated, the photosensitive layer being insulated from the first electrode layer and the second electrode layer, and the first electrode layer, the photosensitive layer, and the second electrode layer forming a plurality of touch units arranged in an array; wherein the photosensitive layer is configured to generate a dielectric constant change at a position under irradiation by light from the line light source.

In some embodiments, the line light source is a laser pointer, the laser pointer being communicatively connected to the display device.

In a fourth aspect of the embodiments of the present disclosure, a touch method is provided, which is applied to the above-mentioned display device.

The method includes: loading drive signals to the plurality of touch units via the plurality of touch drive lines; receiving sensing signals output by the plurality of touch units via the plurality of touch sensing lines; and determining a first position under irradiation by a line light source in the touch panel based on the received sensing signals.

In some embodiments, determining the first position under irradiation by the line light source in the touch panel based on the received sensing signals includes: determining current capacitances of the touch units in the touch panel based on the received sensing signals; determining capacitance change values of the touch units based on the current capacitances of the touch units and reference capacitances of the touch units; and determining the first position under irradiation by the line light source in the touch panel based on the capacitance change values of the touch units.

In some embodiments, the method further includes: determining a second position under pressing in the touch panel based on the capacitance change values of the touch units.

In some embodiments, determining the capacitance change values of the touch units based on the current capacitances of the touch units and the reference capacitances of the touch units includes: determining a difference value between the reference capacitance of each of the touch units and the current capacitance of the touch unit as the capacitance change value of the touch unit; determining the first position under irradiation by the line light source in the touch panel based on the capacitance change values of the touch units includes: determining the position of the first touch unit in the touch panel as the first position in the case that the capacitance change value of a first touch unit is a negative value and the capacitance change value of the first touch unit is less than a first threshold; and determining the second position under pressing in the touch panel based on the capacitance change values of the touch units includes: determining the position of the second touch unit in the touch panel as the second position in the case that the capacitance change value of a second touch unit is a positive value and a capacitance change value of the second touch unit is greater than a second threshold, determining the position of the second touch unit in the touch panel as the second position; wherein each of the first touch unit and the second touch unit is any one of the plurality of touch units, the first threshold is a negative value, and the second threshold is a positive value.

BRIEF DESCRIPTION OF THE DRAWINGS

FIG. 9 is an effect diagram of reference capacitances of touch units in a touch panel according to an embodiment of the present disclosure;

FIG. 10 is an effect diagram of current capacitances of touch units in a touch panel according to an embodiment of the present disclosure;

FIG. 11 is an effect diagram of capacitance change values of touch units in a touch panel according to an embodiment of the present disclosure;

DETAILED DESCRIPTION

For clearer descriptions of the objectives, technical solutions, and advantages of the present disclosure, the embodiments of the present disclosure are described in detail hereinafter with reference to the accompanying drawings.

At present, large-sized touch display devices may generally be applied in scenes such as classroom education and multi-person meetings. Where the large-sized touch display device merely possesses a contact-type touch function, the operator needs to approach the touch display device in the case of using the large-sized touch display device. In this way, the operator is not only difficult to achieve full-screen touch, but also unable to observe the entire screen well, thereby resulting in a poor touch effect of the large-sized touch-control display device.

In order to improve the operation experience of users using touch display devices, more and more touch display devices not only need to possess the contact-type touch function, but also need to possess an in-the-air touch function. In this way, the user can not only perform contact-type touch operations with a human hand or a stylus, but also perform touch operations in the air to achieve contactless touch operations.

However, current touch display devices need to be equipped with additional gesture recognition devices such as cameras or sonar devices. The gesture recognition device can recognize the gesture of the user, so as to achieve the in-the-air touch function of the touch display device. However, in the case that the gesture recognition device is the camera, the gesture recognition device can merely recognize the gesture of a single user, and cannot perform touch operations on a plurality of users simultaneously, resulting in poor in-the-air touch effect of the touch display device. In the case that the gesture recognition device is the sonar device, a plurality of sonar devices need to be provided to satisfy the needs of a plurality of users for simultaneous touch operations, which seriously increases the manufacturing cost of the touch display device.

Figure 1:
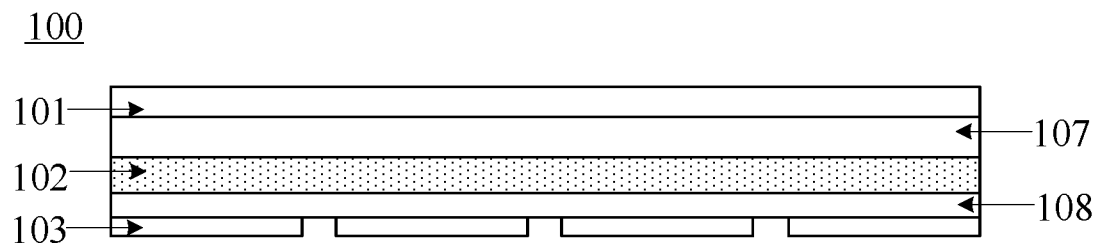
FIG. 1 is a schematic structural diagram of a film layer of a touch panel according to an embodiment of the present disclosure.
Figure 2:
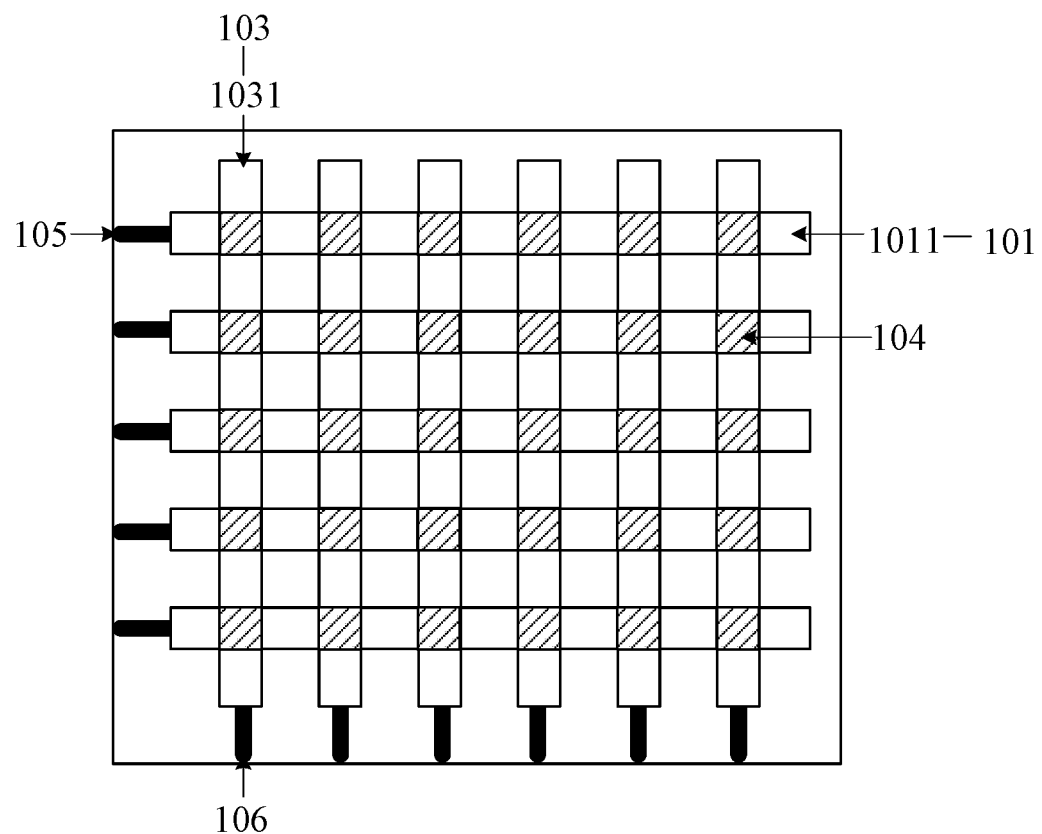
FIG. 2 is a top view of the touch panel shown in FIG. 1.

Referring to FIGS. 1 and 2, FIG. 1 is a schematic structural diagram of a film layer of a touch panel according to an embodiment of the present disclosure, and FIG. 2 is a top view of the touch panel in FIG. 1. The touch panel 100 may include a first electrode layer 101, a photosensitive layer 102, and a second electrode layer 103 that are laminated.

The photosensitive layer 102 may be insulated from the first electrode layer 101 and the second electrode layer 103. In some embodiments, the touch panel 100 may further include a first insulating layer 107 disposed between the first electrode layer 101 and the photosensitive layer 102, and a second insulating layer 108 disposed between the second electrode layer 103 and the photosensitive layer 102. The first electrode layer 101 may be insulated from the photosensitive layer 102 via the first insulating layer 107, and the second electrode layer 103 may be insulated from the photosensitive layer 102 via the second insulating layer 108. In the present disclosure, the first insulating layer 107 and the second insulating layer 108 may be both made of insulated optical adhesives. In this way, the first electrode layer 101 and the photosensitive layer 102 may be bonded via the first insulating layer 107, and the second electrode layer 103 and the photosensitive layer 102 may be bonded via the second insulating layer 108, which effectively improves the firmness between the film layers in the touch panel 100.

In some embodiments, the first electrode layer 101, the photosensitive layer 102, and the second electrode layer 103 may form a plurality of touch units 104 arranged in an array.

The photosensitive layer 102 in the touch panel 100 is configured to generate a dielectric constant change at a position under irradiation by light from a line light source. In this way, the signal output by the touch unit 104 at the position under irradiation by the line light source may change, and the touch panel 100 may determine the position under irradiation by the light from the line light source by sensing the change of the signal output by the touch unit 104.

In some embodiments, the touch panel 100 may further include a plurality of touch drive lines 105 connected to the plurality of touch units 104, and a plurality of touch sensing lines 106 connected to the plurality of touch units 104. In the present disclosure, the plurality of touch drive lines 105 in the touch panel 100 are configured to load touch signals to the plurality of touch units 104, and the plurality of touch sensing lines 106 in the touch panel 100 are configured to receive sensing signals output by the plurality of touch units 104.

The photosensitive layer 102 in the touch panel 100 is configured to, in the case that a drive signal is loaded on the touch unit 104 in the touch panel 100, and the line light source irradiates the touch unit 104, generate the dielectric constant change at the position under irradiation by the light from the line light source to change the sensing signal output by the touch unit 104. It should be noted that the line light source in the present disclosure is capable of emitting light transmitted along a straight line. For example, the line light source may be a laser light source.

In some embodiments, the photosensitive layer 102 in the touch panel 100 may be made of cadmium sulfide, aluminum selenide, aluminum sulfide, lead sulfide, or bismuth sulfide. In the case that the photosensitive layer 102 is not under irradiation by the line light source, most of carriers in the photosensitive layer 102 are disposed in the valence band and are subject to binding energies of nuclei, such that the photosensitive layer 102 is not electrically conductive. In this way, the photosensitive layer 102 is an insulator. In the case that the photosensitive layer 102 is under irradiation by the line light source, the carriers in the photosensitive layer 102 transition to the conduction band, and become a quasi-free state, such that the photosensitive layer 102 can conduct electricity. In this way, the part of the photosensitive layer 102 under irradiation by the line light source is a conductor.

In some embodiments, the first electrode layer 101 in the touch panel 100 may include a plurality of strip-shaped drive electrodes 1011, and the plurality of strip-shaped drive electrodes 1011 may have the same extension direction. The second electrode layer 103 in the touch panel 100 may include a plurality of strip-shaped sensing electrodes 1031, and the plurality of strip-shaped sensing electrodes 1031 may have the same extension direction. The extension direction of the drive electrode 1011 in the touch panel 100 may be intersected with the extension direction of the sensing electrode 1031. For example, the extension direction of the drive electrode 1011 may be perpendicular to the extension direction of the sensing electrode 1031.

In this case, the plurality of touch units 104 in the touch panel 100 are disposed in an intersection area formed by the plurality of strip-shaped drive electrodes 1011 and the plurality of strip-shaped sensing electrodes 1031. For example, the touch units 104 in the touch panel 100 may include a first part in one strip-shaped drive electrode 1011, and a second part in one strip-shaped sensing electrode 1031, and a part in the photosensitive layer 102 between the first part and the second part. An orthographic projection of the first part of the touch unit 104 on the photosensitive layer 102 is completely overlapped with an orthographic projection of the second part on the photosensitive layer 102.

Figure 3:
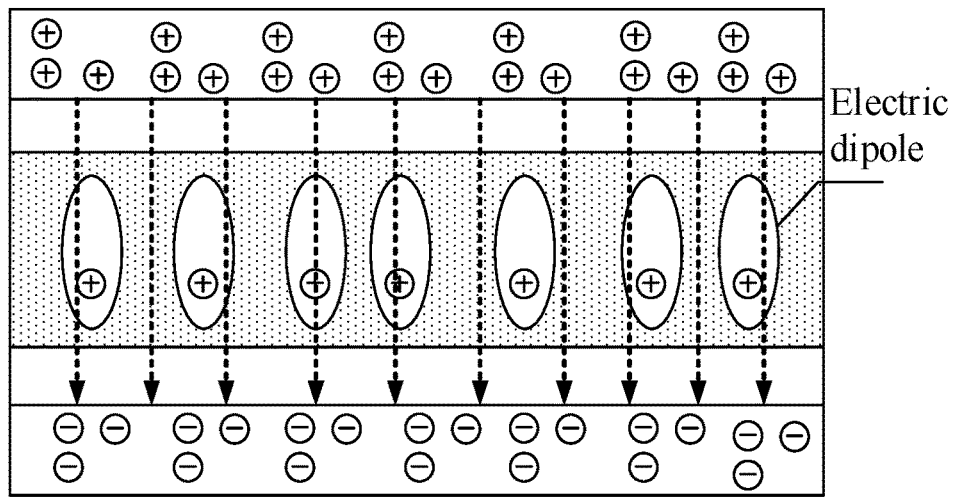
FIG. 3 is an effect diagram of internal charge distribution of a touch unit in the case that a photosensitive layer is not under irradiation by a line light source according to an embodiment of the present disclosure.

The touch unit 104 in the touch panel 100 is equivalent to a capacitor. The calculation formula of the capacitance of the capacitor is $C=\varepsilon S/d$, where C represents the capacitance of the capacitor, $\varepsilon$ represents the dielectric constant of the insulating medium between the two electrodes in the capacitor, S represents the area of the two intersected electrodes in the capacitor, and d represents the distance between the two electrodes in the capacitor. Therefore, in the case that the photosensitive layer 102 is not under irradiation by the line light source, the photosensitive layer 102 is an insulator. In the case that the photosensitive layer 102 is inserted into the capacitor (that is, the touch unit 104), the dielectric constant of the insulating medium in the capacitor increases, and the capacitance of the capacitor increases. In an embodiment, as shown in FIG. 3, FIG. 3 is an effect diagram of internal charge distribution of a touch unit in the case that a photosensitive layer is not under irradiation by a line light source according to an embodiment of the present disclosure. In the case that an electric signal is loaded onto the first electrode layer 101, the capacitor can be charged. Upon charging of the capacitors, an electric dipole is generated inside the photosensitive layer 102, and the electric dipole may cancel the electric field generated in the capacitor, such that the capacitor needs more charges to maintain the voltage, which is manifested as an increase of the capacitance of the capacitor. It should be noted that in the case that the photosensitive layer 102 is inserted into the capacitor, and the photosensitive layer 102 is not under irradiation by the line light source, the capacitance of the capacitor is fixed.

Figure 4:
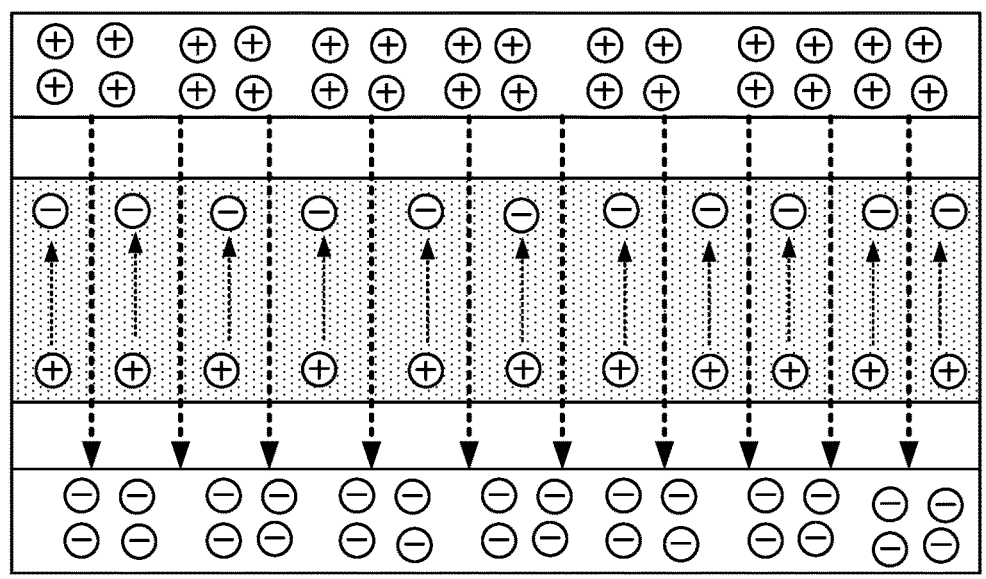
FIG. 4 is an effect diagram of internal charge distribution of a touch unit in the case that a photosensitive layer is under irradiation by a line light source according to an embodiment of the present disclosure.

In the case that the photosensitive layer 102 in the capacitor is under irradiation by the line light source, the part of the photosensitive layer 102 under irradiation by the line light source is a conductor, and the dielectric constant of the photosensitive layer 102 increases, such that the capacitance of the capacitor increases. Illustratively, as shown in FIG. 4, FIG. 4 is an effect diagram of internal charge distribution of a touch unit in the case that a photosensitive layer is under irradiation by a line light source according to an embodiment of the present disclosure. A large number of free carriers may be generated in the part of the photosensitive layer 102 under irradiation by the line light source. In this way, in the case that the electric signal is loaded onto the first electrode layer 101, the capacitor may be charged. Upon the capacitor is charged, the free carriers generated in the part of the photosensitive layer 102 under irradiation by the light source are rearranged, and the photosensitive layer 102 may form the electric field opposite to the electric field in the capacitor. In this way, the capacitor needs to be charged with a large amount of charges to maintain the voltage, which is manifested as a substantial increase of the capacitance of the capacitor. It should be noted that as the photosensitive layer 102 is insulated from the first electrode layer 101 and the second electrode layer 103, even if the photosensitive layer 102 becomes the conductor upon being irradiated by the light source, the photosensitive layer 102 does not affect the structure of the capacitor.

In this case, in the case that the photosensitive layer 102 is not under irradiation by the line light source, the capacitance of the capacitor remains unchanged; and in the case that the photosensitive layer 102 is under irradiation by the line light source, the capacitance of the capacitor increases. In this way, in the case that the touch panel 100 loads drive signals to the plurality of touch units 104 via the plurality of touch drive lines 105, and receives sensing signals output by the plurality of touch units 104 via the plurality of touch sensing lines 106, the touch panel 100 may determine the touch unit with an increased capacitance among the plurality of touch units 104 based on the received sensing signals. The touch unit with the increased capacitance is the touch unit under irradiation by the line light source, and thus a first position under irradiation by the line light source in the touch panel 100 may be determined. In this way, in the case that the touch panel is integrated into a display device, the user may use a laser pointer to irradiate the touch panel 100 to achieve in-the-air touch on the display device.

It should be noted that the touch panel 100 according to the embodiments of the present disclosure may not only realize the in-the-air touch function, but also possesses a contact-type touch function.

Figure 5:
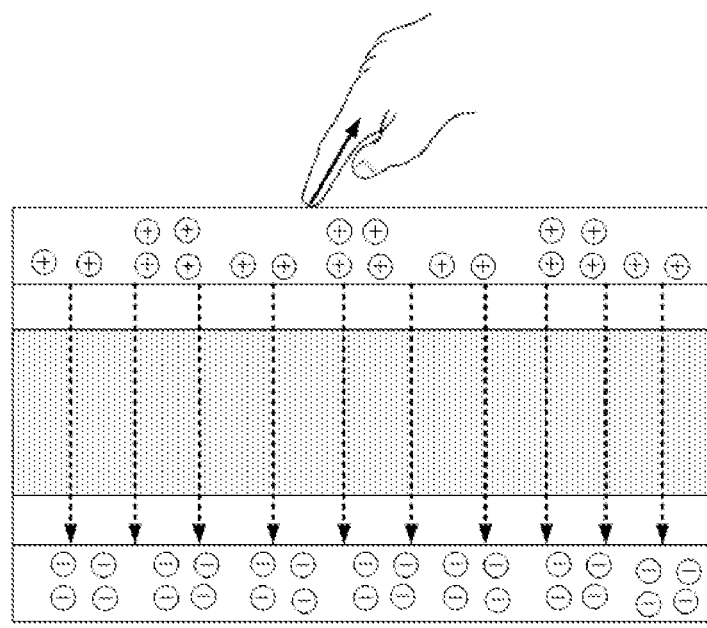
FIG. 5 is an effect diagram of internal charge distribution of a touch unit in the case that a touch panel is pressed according to an embodiment of the present disclosure.

Illustratively, as shown in FIG. 5, FIG. 5 is an effect diagram of internal charge distribution of a touch unit in the case that a touch panel is pressed according to an embodiment of the present disclosure. In the case that the electric signal is loaded onto the first electrode layer 101, the capacitor may be charged. Upon charging of the capacitor, where the touch panel 100 is pressed by a human hand or a stylus, the human hand or the stylus may absorb a part of the charges on the electrode plate in the capacitor, which is manifested as a significant decrease of the capacitance of the capacitor.

In this case, the capacitance of the capacitor remains unchanged when the touch panel 100 is not pressed; and when the touch panel 100 is pressed by the human hand or the stylus, the capacitance of the capacitor decreases. In this way, in the case that the touch panel 100 loads drive signals to the plurality of touch units 104 via the plurality of touch drive lines 105, and receives sensing signals output by the plurality of touch units 104 via the plurality of touch sensing lines 106, the touch panel 100 may determine the touch unit with a decreased capacitance among the plurality of touch units 104 via the received sensing signals. The touch unit with the decreased capacitance is the touch unit pressed by the human hand or the stylus, and thus a second position under pressing in the touch panel 100 may be determined. In this way, in the case that the touch panel is integrated into the display device, the user can use the human hand or the stylus to press the touch panel 100 to achieve contact-type touch on the display device.

It should be noted that in the case that the touch unit 104 is not pressed and is not under irradiation by the line light source, the capacitance of the touch unit 104 is fixed. In the case that the touch unit 104 is under irradiation by the line light source, the capacitance of the touch unit 104 increases; and in the case that the touch unit 104 is pressed, the capacitance of the touch unit 104 decreases. Therefore, in the case that the touch panel 100 is integrated into the display device, the in-the-air touch and contact-type touch may be realized, and a distinction may be made between the in-the-air touch and the contact-type touch by detecting changes of the capacitances of the plurality of touch units 104 in the touch panel 100. For example, in the case that the capacitance of a touch unit becomes larger, the position of the touch unit in the touch panel 100 is determined as the position under irradiation by the line light source; and in the case that the capacitance of a touch unit becomes smaller, the position of the touch unit in the touch panel 100 is determined as the position pressed by the finger or the stylus.

It should further be noted that the touch panel 100 in the embodiments of the present disclosure belongs to a capacitive touch panel, and the touch panel is provided with a plurality of touch units 104 (i.e., capacitors). The touch position is determined by detecting changes in the capacitances of the touch units 104. Therefore, the touch panel 100 can realize multi-point touch, which can satisfy the requirements of the plurality of users for simultaneous touch.

It should further be noted that in FIG. 3, FIG. 4 and FIG. 5, "+" represents a positive charge, "−" represents a negative charge, the thick dashed arrow represents the direction of the electric field in the capacitor, the thin dashed arrow represents the direction of the electric field in the photosensitive layer 102, and the solid arrow indicates the movement direction of the charges.

In some embodiments, the first electrode layer 101 and the second electrode layer 103 in the touch panel 100 are both made of a transparent conductive material. For example, the first electrode layer 101 and the second electrode layer 103 are both made of ITO, or IZO, or the like. In the case where the touch panel 100 is integrated in the display device, as the touch panel 100 is generally disposed in a display area of the display device, when the first electrode layer 101 and the second electrode layer 103 are both made of the transparent conductive material, the touch panel 100 does not affect the normal display of the display device.

In summary, the touch panel according to the embodiments of the present disclosure includes a first electrode layer, a photosensitive layer, and a second electrode layer that are laminated, and the photosensitive layer is insulated from the first electrode layer and the second electrode layer. The first electrode layer, the photosensitive layer, and the second electrode layer can form a plurality of touch units arranged in an array. In the case that a touch unit is not pressed and is not under irradiation by a line light source, a capacitance of the touch unit is fixed. In the case that the touch unit is under irradiation by the line light source, the capacitance of the touch unit increases; and in the case that the touch unit is pressed, the capacitance of the touch unit decreases. Therefore, in the case that the touch panel is disposed in a display device, the in-the-air touch and contact-type touch of the display device may be realized, and a distinction may be made between the in-the-air touch and the contact-type touch by detecting changes of the capacitances of the plurality of touch units 104 in the touch panel 100. The touch panel belongs to a capacitive touch panel, which can realize multi-point touch, and can satisfy the requirements of a plurality of users for simultaneous touch, thereby effectively improving the touch effect of the display device. In addition, the in-the-air touch of the display device can be realized without providing a gesture recognition device in the display device, which effectively reduces the manufacturing cost of the display device.

Figure 6:
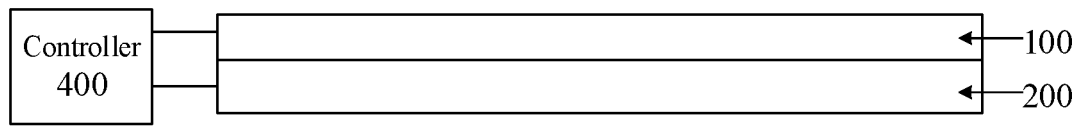
FIG. 6 is a schematic structural diagram of a display device according to an embodiment of the present disclosure.

Referring to FIG. 6, FIG. 6 is a schematic structural diagram of a display device according to an embodiment of the present disclosure. The display device may include a display panel 200 and a touch panel 100 disposed on a light-emitting side of the display panel 200. The touch panel 100 may be the touch panel shown in FIG. 1, and the display panel 200 may be a liquid crystal display panel or an OLED display panel.

In some embodiments, a film layer structure in the touch panel 100 may be directly fabricated on the light-emitting side of the display panel 200. In some embodiments, the film layer structure in the touch panel 100 may be first fabricated on a substrate, and then the touch panel 100 is bonded to the light-emitting side of the display panel 200 via an optical adhesive.

Figure 7:
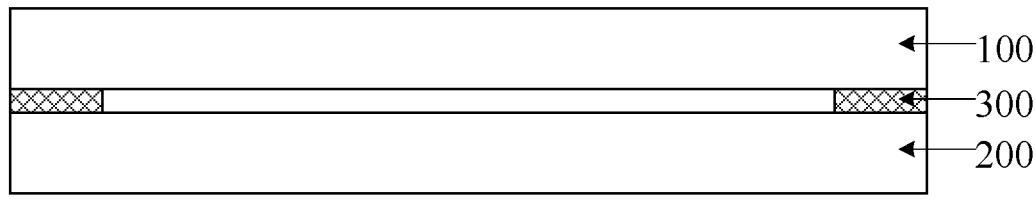
FIG. 7 is a schematic structural diagram of another display device according to an embodiment of the present disclosure.
Figure 8:
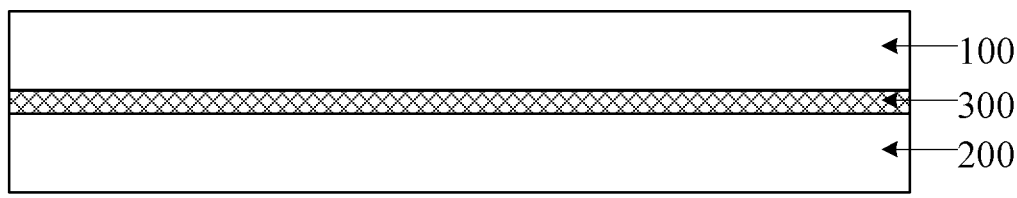
FIG. 8 is a schematic structural diagram of still another display device according to an embodiment of the present disclosure.

Illustratively, as shown in FIG. 7, FIG. 7 is a schematic structural diagram of another display device according to an embodiment of the present disclosure. The touch panel 100 may be bonded to the light-emitting side of the display panel 200 via a ring-shaped optical adhesive 300. Alternatively, as shown in FIG. 8, FIG. 8 is a schematic structural diagram of another display device according to an embodiment of the present disclosure. The touch panel 100 may be bonded to the light-emitting side of the display panel 200 via the optical adhesive 300.

In the embodiment of the present disclosure, as shown in FIG. 7, the display device may further include a controller 400. The controller 400 may be electrically connected to the touch panel 100. For example, the controller 400 may be electrically connected to the plurality of touch drive lines and the plurality of touch sensing lines in the touch panel 100. The controller 400 is configured to load drive signals to the plurality of touch units via the plurality of touch drive lines; receive sensing signals output by the plurality of touch units via the plurality of touch sensing lines; and determine a first position under irradiation by the line light source in the touch panel 100.

In some embodiments, the controller 400 is configured to determine current capacitances of the touch units in the touch panel based on the received sensing signals; determine capacitance change values of the touch units based on the current capacitances of the touch units and reference capacitances of the touch units; and determine the first position under irradiation by the line light source in the touch panel 100 based on the capacitance change values of the touch units. The reference capacitances of the touch units are the capacitances of the touch units in the touch panel 100 in the case that the touch panel 100 is not under irradiation by the line light source and is not pressed.

In the present disclosure, the controller 400 is further configured to determine a second position under pressing in the touch panel 100 based on the capacitance change values of the touch units.

In some embodiments, in the case that the touch panel 100 is under irradiation by the line light source, the capacitance of the touch unit at the position under irradiation by the line light source increases, and the controller 400 may detect the change value of the capacitance of the touch unit by receiving the sensing signal output by the touch sensing signal line connected to the touch unit. In this way, the first position under irradiation by the line light source may be determined in the touch panel 100. In the case that the touch panel 100 is pressed, the capacitance of the touch unit at the pressed position becomes smaller, and the controller 400 can detect the change value of the capacitance of the touch unit by receiving the sensing signal output by the touch sensing signal line connected to the touch unit. In this way, the second position under pressing in the touch panel 100 may be determined.

In some embodiments, the controller 400 is configured to: sequentially apply drive signals to the plurality of drive electrodes in the touch panel 100; and receive sensing signals via the sensing electrodes in the case that the drive signal is applied to the drive electrodes. In this way, the controller 400 can acquire the current capacitances of the touch units based on the sensing signals received by the sensing electrodes. In the present disclosure, in the case that the display device is operating, the controller 400 needs to periodically acquire the current capacitances of the touch units, so as to determine the position where the touch occurs in the display device in real time.

The controller 400 is configured to: determine a difference value between the reference capacitance of each of the touch units and the current capacitance of the touch unit as a capacitance change value of the touch unit; determine the position of the first touch unit in the touch panel as the first position (i.e., the position under irradiation by the line light source) in the case that the capacitance change value of a first touch unit is a negative value, and the capacitance change value of the first touch unit is less than a first threshold; and determine the position of the second touch unit in the touch panel as the second position (i.e., the position being pressed) in the case that the capacitance change value of a second touch unit is a positive value, and the capacitance change value of the second touch unit is greater than a second threshold. Each of the first touch unit and the second touch unit is any one of the plurality of touch units, the first threshold is a negative value, and the second threshold is a positive value.

Illustratively, as shown in FIGS. 9, 10, and 11, FIG. 9 is an effect diagram of reference capacitances of touch units in a touch panel according to an embodiment of the present disclosure, FIG. 10 is an effect diagram of current capacitances of touch units in a touch panel according to an embodiment of the present disclosure, and FIG. 11 is an effect diagram of capacitance change values of touch units in a touch panel according to an embodiment of the present disclosure. Assuming that the first threshold is −20, the second threshold is 20, then, in FIG. 11, the position a is the first position under irradiation by the line light source, and the position b is the second position pressed by a human hand or a stylus.

It should be noted that as the line light source is generally a laser light source emitted by a laser pointer, an illuminance of the laser light source is much higher than an illuminance of ambient light. Therefore, the change value of the capacitance of the touch unit in the case that the laser light source irradiates the touch panel is much greater than the change value of the capacitance of the touch unit in the case that the ambient light irradiates the touch panel. Therefore, the influence of the ambient light on the touch panel 100 may be filtered out by setting the first threshold, thereby effectively improving the accuracy of the controller 400 in determining the first position under irradiation by the line light source. In addition, the influence of interference objects in the environment on the touch panel 100 may be avoided by setting the second threshold, thereby effectively improving the accuracy of the controller 400 in determining the second position pressed by the human hand or the stylus. It should further be noted that, in FIGS. 9 to 11, Tx represents drive electrodes, and Rx represents sensing electrodes.

In some embodiments, the controller 400 may further be connected to the display panel 200, and the controller 400 is further configured to control the display panel 200 to display a cursor at a third position corresponding to the first position under irradiation by the line light source. It should be noted that the third position is a position overlapped with the first position in the display panel. In this way, a light pen may be provided with buttons, and the light pen may establish a communication connection with the display device. In the case that the line light source emitted by the light pen irradiates a display surface of the display device, the display device may display the cursor synchronously. Therefore, the light pen is similar to a mouse, and interaction with the display device may be achieved via the buttons of the light pen.

Figure 12:
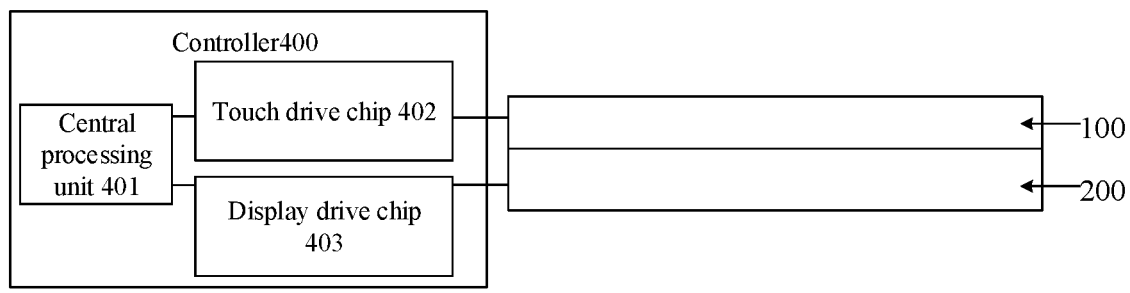
FIG. 12 is a schematic structural diagram of yet another display device according to an embodiment of the present disclosure.

Illustratively, as shown in FIG. 12, FIG. 12 is a schematic structural diagram of still another display device according to an embodiment of the present disclosure. The controller 400 may include a central processing unit 401, and a touch drive chip 402 and a display drive chip 403 respectively connected to the central processing unit 401. The touch drive chip 402 may be electrically connected to the touch panel 100. For example, the touch drive chip 402 may be electrically connected to the plurality of touch drive lines in the touch panel 100, and may further be electrically connected to the plurality of touch sensing lines in the touch panel 100. The display drive chip 403 may be electrically connected to the display panel 200. The touch drive chip 402 may determine at least one of the first position or the second position in the touch panel, and send the position information of the first position to the central processing unit 401 in the case of determining the first position, such that the central processing unit 401 displays the cursor at the third position of the display panel 100 via the display drive chip 403.

Figure 13:
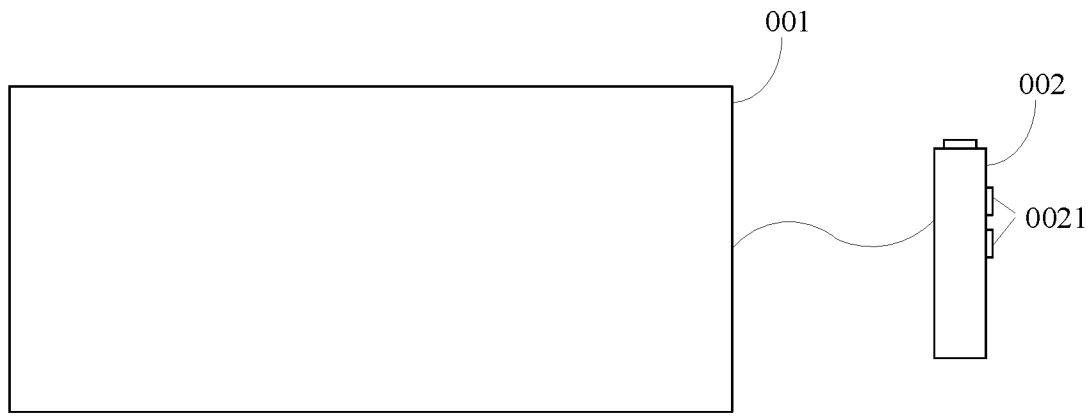
FIG. 13 is a schematic structural diagram of a display system according to an embodiment of the present disclosure.

Referring to FIG. 13, FIG. 13 is a schematic structural diagram of a display system according to an embodiment of the present disclosure. The display system may include a display device 001 and a light pen 002. The display device 001 may be communicatively connected to the light pen 002. For example, the display device 001 and the light pen 002 may be communicatively connected over a wireless network such as Bluetooth or Wi-Fi, or may be communicatively connected over a wired network such as a data cable. The display device 001 may be the display device according to the above embodiments. The light pen 002 may be a laser pointer, and the light pen 002 is provided with a button 0021.

In this case, in the case that the controller in the display device 001 determines the first position under irradiation by the line light source in the touch panel, the controller may control the display panel to display the cursor at the third position corresponding to the first position. In the case that the display device 001 receives a control instruction triggered by the button 0021 of the light pen 002, the display device 001 may make a corresponding control response. In the case that the controller in the display device 001 determines the second position under pressing by the finger or the stylus on the touch panel, the controller may directly control the display device to perform the corresponding control response.

An embodiment of the present disclosure further provides a touch method, which is applied to the display device according to the above embodiments. The touch method may include the following processes.

In S11, drive signals are loaded to the plurality of touch units via the plurality of touch drive lines.

In S12, sensing signals output by the plurality of touch units are received via the plurality of touch sensing lines.

In S13, the first position under irradiation by the line light source in the touch panel is determined based on the received sensing signals.

In some embodiments, S13 may include: determining current capacitances of the touch units in the touch panel based on the received sensing signals; determining capacitance change values of the touch units based on the current capacitances of the touch units and reference capacitances of the touch units; and determining the first position under irradiation by the line light source in the touch panel based on the capacitance change values of the touch units.

In some embodiments, upon determining the capacitance change values of the touch units, the touch method further includes: determining the second position under pressing in the touch panel based on the capacitance change values of the touch units.

In some embodiments, determining the capacitance change values of the touch units based on the current capacitances of the touch units and the reference capacitances of the touch units in the foregoing method may include: determining a difference value between the reference capacitance of each of the touch units and the current capacitance of the touch unit as the capacitance change value of the touch unit.

In the above method, determining the first position under irradiation by the line light source in the touch panel based on the capacitance change values of the touch units may include: determining the position of the first touch unit in the touch panel as the first position in the case that the capacitance change value of a first touch unit is a negative value and a capacitance change value of the first touch unit is less than a first threshold.

In the above method, determining the second position under pressing in the touch panel based on the capacitance change values of the touch units may include: determining the position of the second touch unit in the touch panel as the second position in the case that the capacitance change value of a second touch unit is a positive value and a capacitance change value of the second touch unit is greater than a second threshold.

Each of the first touch unit and the second touch unit is any one of the plurality of touch units, the first threshold is a negative value, and the second threshold is a positive value.

In some embodiments, the touch method further includes: controlling the display panel to display the cursor at the third position corresponding to the first position under irradiation by the line light source.

Those skilled in the art can clearly understand that for the convenience and conciseness of the description, the specific principles of the touch method described above may refer to the corresponding content in the embodiments of the structure of the display device, which is not repeated herein.

It should be pointed out that in the accompanying drawings, the sizes of layers and regions may be exaggerated for clearer illustration. It should be understood that in the case that an element or layer is referred to as being "on" another element or layer, it may be directly on another element, or intervening layers may be present. In addition, it should be understood that in the case that an element or layer is referred to as being "under" another element or layer, the layer may be directly under the other element, or there may be more than one intervening layer or element. In addition, it can further be understood that in the case that a layer or element is referred to as being "between" two layers or two elements, the layer may be the only layer between the two layers or two elements, or more than one intervening layer or element may also be present. Similar reference numerals indicate similar elements throughout.

In the present disclosure, the terms "first" and "second" are only used for descriptive purposes, and cannot be understood as indicating or implying relative importance. The term "a plurality of" refers to two or more, unless expressly defined otherwise.

It should be understood by persons of ordinary skill in the art that all or part of the processes in the above-mentioned embodiments may be implemented by hardware, or by a corresponding hardware instructed by a program. The program may be stored in a computer-readable storage medium, and the storage medium mentioned above may be a read-only memory, a magnetic disk, an optical disk, or the like.

Described above are merely exemplary embodiments of the present disclosure, and are not intended to limit the present disclosure. Therefore, any modifications, equivalent substitutions, improvements, and the like made within the spirit and principles of the present disclosure shall be included in the protection scope of the present disclosure.

What is claimed is:

1. A display device, comprising: a display panel and a touch panel disposed on a light-emitting side of the display panel, wherein the touch panel comprises:
    a first electrode layer, a photosensitive layer, and a second electrode layer that are laminated, the photosensitive layer being insulated from the first electrode layer and the second electrode layer, and the first electrode layer, the photosensitive layer, and the second electrode layer forming a plurality of touch units arranged in an array;
    wherein the photosensitive layer is configured to generate a dielectric constant change at a position under irradiation by light from a line light source,
    wherein the touch panel further comprises: a plurality of touch drive lines connected to the plurality of touch units, and a plurality of touch sensing lines connected to the plurality of touch units; and
    the display device further comprises a controller,
    wherein the controller is configured to:
    load drive signals to the plurality of touch units via the plurality of touch drive lines;
    receive sensing signals output by the plurality of touch units via the plurality of touch sensing lines; and
    determine a first position under irradiation by the line light source in the touch panel based on the received sensing signals,
    wherein the controller is further configured to:
    determine current capacitances of the touch units in the touch panel based on the received sensing signals;
    determine capacitance change values of the touch units based on the current capacitances of the touch units and reference capacitances of the touch units; and
    determine the first position under irradiation by the line light source in the touch panel based on the capacitance change values of the touch units,
    wherein the controller is further configured to:
    determine a second position under pressing in the touch panel based on the capacitance change values of the touch units,
    wherein the controller is further configured to:
    determine a difference value between the reference capacitance of each of the touch units and the current capacitance of the touch unit as the capacitance change value of the touch unit;
    determine a position of a first touch unit in the touch panel as the first position in the case that the capacitance change value of the first touch unit is a negative value and the capacitance change value of the first touch unit is less than a first threshold; and
    determine a position of a second touch unit in the touch panel as the second position in the case that the capacitance change value of the second touch unit is a positive value and the capacitance change value of the second touch unit is greater than a second threshold;
    wherein each of the first touch unit and the second touch unit is any one of the plurality of touch units, the first threshold is a negative value, and the second threshold is a positive value.

2. The display device according to claim 1, wherein the controller is further configured to:
    control the display panel to display a cursor at a third position corresponding to the first position under irradiation by the line light source.

3. A display system, comprising: a line light source and a display device, wherein the display device comprises: a display panel and a touch panel disposed on a light-emitting side of the display panel;
    wherein the touch panel comprises: a first electrode layer, a photosensitive layer, and a second electrode layer that are laminated, the photosensitive layer being insulated from the first electrode layer and the second electrode layer, and the first electrode layer, the photosensitive layer, and the second electrode layer forming a plurality of touch units arranged in an array;
    wherein the photosensitive layer is configured to generate a dielectric constant change at a position under irradiation by light from the line light source,
    wherein the touch panel further comprises: a plurality of touch drive lines connected to the plurality of touch units, and a plurality of touch sensing lines connected to the plurality of touch units; and the display device further comprises a controller, wherein the controller is configured to:

load drive signals to the plurality of touch units via the plurality of touch drive lines;

receive sensing signals output by the plurality of touch units via the plurality of touch sensing lines; and determine a first position under irradiation by the line light source in the touch panel based on the received sensing signals, wherein the controller is further configured to:

determine current capacitances of the touch units in the touch panel based on the received sensing signals;

determine capacitance change values of the touch units based on the current capacitances of the touch units and reference capacitances of the touch units; and determine the first position under irradiation by the line light source in the touch panel based on the capacitance change values of the touch units, wherein the controller is further configured to:

determine a second position under pressing in the touch panel based on the capacitance change values of the touch units, wherein the controller is further configured to:

determine a difference value between the reference capacitance of each of the touch units and the current capacitance of the touch unit as the capacitance change value of the touch unit;

determine a position of a first touch unit in the touch panel as the first position in the case that the capacitance change value of the first touch unit is a negative value and the capacitance change value of the first touch unit is less than a first threshold; and determine a position of a second touch unit in the touch panel as the second position in the case that the capacitance change value of the second touch unit is a positive value and the capacitance change value of the second touch unit is greater than a second threshold;

wherein each of the first touch unit and the second touch unit is any one of the plurality of touch units, the first threshold is a negative value, and the second threshold is a positive value.

4. The display system according to claim 3, wherein the line light source is a laser pointer, the laser pointer being communicatively connected to the display device.

5. A touch method, applicable to a display device, wherein the display device comprises a display panel and a touch panel disposed on a light-emitting side of the display panel, wherein the touch panel comprises a first electrode layer, a photosensitive layer, and a second electrode layer that are laminated, the photosensitive layer being insulated from the first electrode layer and the second electrode layer, and the first electrode layer, the photosensitive layer, and the second electrode layer forming a plurality of touch units arranged in an array, wherein the photosensitive layer is configured to generate a dielectric constant change at a position under irradiation by light from a line light source, wherein the touch panel further comprises: a plurality of touch drive lines connected to the plurality of touch units, and a plurality of touch sensing lines connected to the plurality of touch units; and the display device further comprises a controller configured to load drive signals to the plurality of touch units via the plurality of touch drive lines receive sensing signals output by the plurality of touch units via the plurality of touch sensing lines, and determine a first position under irradiation by the line light source in the touch panel based on the received sensing signals, the method comprising:

loading drive signals to the plurality of touch units via the plurality of touch drive lines;

receiving sensing signals output by the plurality of touch units via the plurality of touch sensing lines; and determining a first position under irradiation by a line light source in the touch panel based on the received sensing signals, wherein determining the first position under irradiation by the line light source in the touch panel based on the received sensing signals comprises:

determining current capacitances of the touch units in the touch panel based on the received sensing signals;

determining capacitance change values of the touch units based on the current capacitances of the touch units and reference capacitances of the touch units; and determining the first position under irradiation by the line light source in the touch panel based on the capacitance change values of the touch units, the method further comprising:

determining a second position under pressing in the touch panel based on the capacitance change values of the touch units, wherein determining the capacitance change values of the touch units based on the current capacitances of the touch units and the reference capacitances of the touch units comprises:

determining a difference value between the reference capacitance of each of the touch units and the current capacitance of the touch unit as the capacitance change value of the touch unit;

determining the first position under irradiation by the line light source in the touch panel based on the capacitance change values of the touch units comprises:

determining a position of a first touch unit in the touch panel as the first position in the case that the capacitance change value of the first touch unit is a negative value and the capacitance change value of the first touch unit is less than a first threshold; and determining the second position under pressing in the touch panel based on the capacitance change values of the touch units comprises:

determining a position of a second touch unit in the touch panel as the second position in the case that the capacitance change value of the second touch unit is a positive value and a capacitance change value of the second touch unit is greater than a second threshold;

wherein each of the first touch unit and the second touch unit is any one of the plurality of touch units, the first threshold is a negative value, and the second threshold is a positive value.

* * * * *